United States Patent Office 3,479,740
Patented Nov. 25, 1969

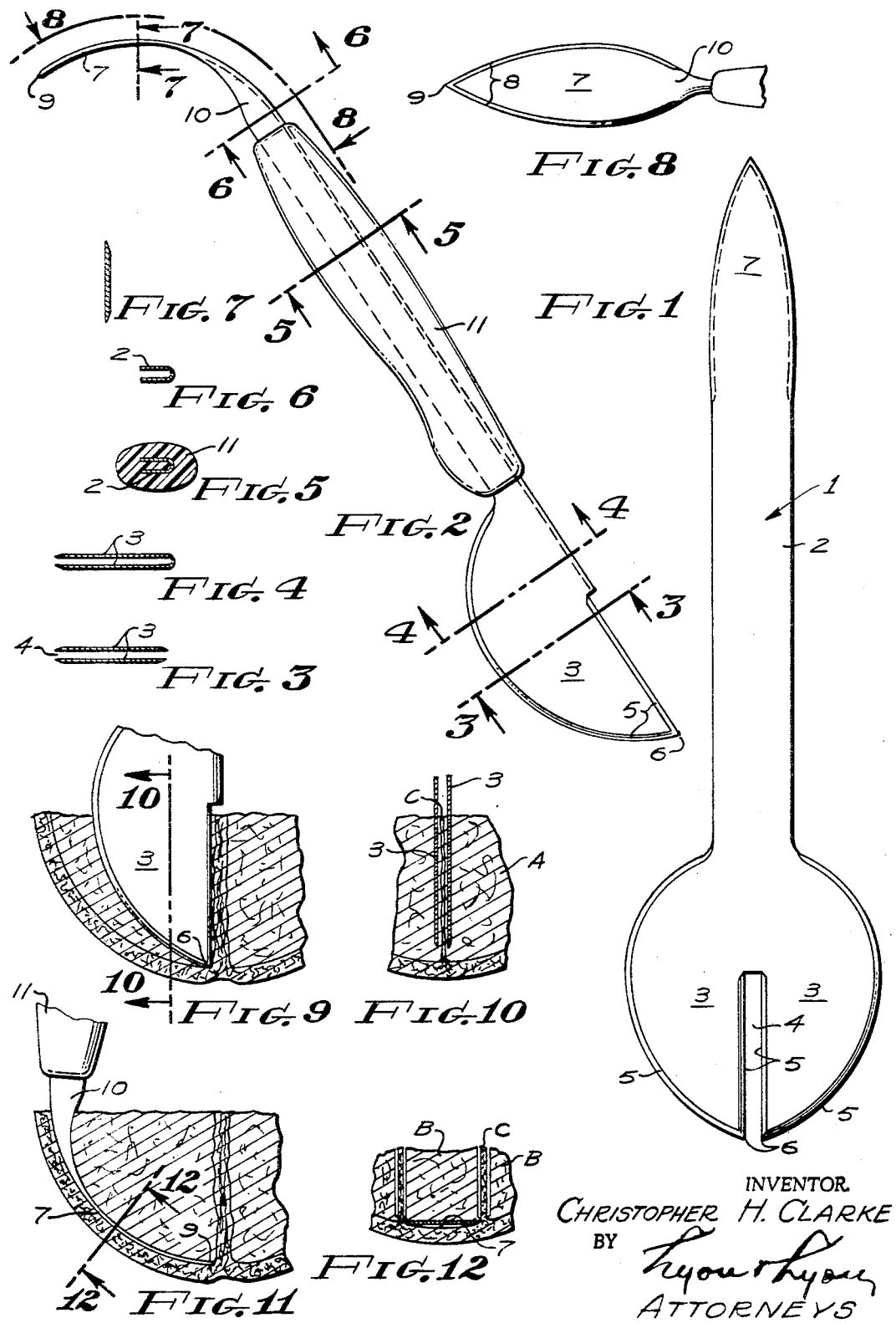

3,479,740
SEGMENT SEVERING IMPLEMENT
Christopher H. Clarke, 1575 Homewood Drive,
Altadena, Calif. 91001
Filed Oct. 19, 1967, Ser. No. 676,572
Int. Cl. B67b 7/24
U.S. Cl. 30—24                                    2 Claims

ABSTRACT OF THE DISCLOSURE

An instrument for cutting to permit intact subsequent removal of segments of fruit such a grapefruit or oranges in which a flat double blade has a configuration corresponding to a grapefruit or orange segment membrane in profile is used to make an initial cut along opposite sides of a pair of membranes to sever the intervening segment, and a complementary curved single blade has in side aspect a curvature corresponding to the curvature of the rind of the fruit and in plan aspect a wedge shape corresponding to the shape of the segment as severed from the membranes is used to make a final cut contiguous to the rind to complete severance of the fruit segment.

Background of the invention

Numerous attempts have been made to shape knives so that segments of segmented type fruit such as grapefruit and oranges may be severed for removal without crushing or squeezing the segment and thus cause loss of the juice. These attempts have been confined to the construction of a single knife. Due to the complicated configuration of the segments of fruit such as grapefruit or oranges, a single blade cannot perform the functions of severing the segments from the flat, segment defining, membranes and also sever the segments from the essentially spherically contoured rind of the fruit.

Summary of the invention

The present invention is directed to the problem of severing segments of fruit such as grapefruit and the objects of this invention include:

First, to provide an implement which severs segments of fruit such as grapefruit or oranges while minimizing pressure on the cells of the segments so that the segment may be removed intact with a minimum loss of juice.

Second, to provide an implement for severing fruit segments which utilizes a pair of cooperating knives, one for severing the segment from the radial membrane by cutting simultaneously on each side thereof to the rind of the fruit; the other for severing the segment from the rind by cutting arcuately following the curvature of the rind.

Third, to provide an implement of this type which not only severs each segment but also, if desired, may be used to lift the segment from the fruit half.

Description of figures

FIGURE 1 is a developed view of the blank from which the implement is formed.
FIGURE 2 is a side view of the implement.
FIGURES 3, 4, 5, 6 and 7 are transverse sectional views thereof, taken through 3—3, 4—4, 5—5, 6—6 and 7—7 of FIGURE 2.
FIGURE 8 is a fragmentary view, taken from 8—8 of FIGURE 2.
FIGURE 9 is a fragmentary sectional view of a segmented fruit, showing the manner in which the double blade is used to sever segments from the membrane.
FIGURE 10 is a fragmentary sectional view, taken through 10—10 of FIGURE 9.
FIGURE 11 is a view similar to FIGURE 9, showing the manner in which the single blade is used to separate the segment from the rind of the fruit.
FIGURE 12 is a fragmentary sectional view, taken through 12—12 of FIGURE 11.

The implement is intended primarily for use on an orange or grapefruit half, indicated by A, for the purpose of severing the segments B from the membranes C. The implement is formed from a blank 1 of high-strength steel, preferably stainless steel. The central portion of the blank forms a web 2, having at one end laterally enlarged, essentially semi-circular portions which later form a pair of severing blades 3, intended to cut along opposite sides of each membrane C to sever the adjacent segments B therefrom. As blanked, the severing blades 3 extend beyond the web 2, their extended portions are separated by a narrow slot 4. The portions which form the severing blades 3 are sharpened along their curved and extended edges, as indicated by 5, and these portions are pointed at their extremities, as indicated by 6.

The opposite end of the web 2 is wedge-shaped and is intended to form a single blade 7, intended to separate the segment B from the rind D of the orange or grapefruit. The periphery of the blade 7 is sharpened as indicated by 8, and is provided with a pointed extremity 9.

The web 2 is folded transversely to define a U-shape having closely adjacent side portions. In so folding the web, the portions 3 form a double blade, parts of which are parallel and closely adjacent.

The single severing blade 7 is not folded, but remains transversely flat, except for a transition portion 10. The blade is, however, curved longitudinally to define a curvature corresponding approximately to the interface between the rind D and the segments B.

The folded web 2, between the double blades 3 and the single blade 7, is encased in a molded plastic handle 11.

Operation of the segment severing instrument is as follows:

The blades 3 and 7 are employed in sequence and either may be used first. For example, the double blades 3 are inserted downwardly on opposite sides of a membrane C at the apeces of the adjacent segments, as shown in FIGURE 9. The blades are rocked outwardly and the pointed extremities 6 are drawn along the interface between the rind D and the segments B. This operation may be repeated until all of the segments are severed from the membranes. The single blade 7 is then inserted downwardly at the radially outer end of a segment. By reason of the fact that the curvature of the blade 7 approximates the curvature of the interface between the rind D and the segment B, it may be forced under the segment with a rocking motion until the extremity 9 reaches the apex of the segment. The blade 7 may then be used to lift the segment from the fruit or if it is desired to leave the segment intact, the blade may be withdrawn. If the segment is wider than the blade, the blade may be moved circumferentially with respect to the axis of the fruit half to sever the segment completely.

It should be noted that the severing of each segment is accomplished with virtually no crushing of the segment, so that a minimum amount of juice is squeezed therefrom.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:
1. An implement for severing the segments of a half portion of grapefruit, orange or similar fruit wherein the segments are joined to each other by radiating membranes, and jointed to each other at their common center as well as joined to the essentially hemispherical rind of the fruit between said membranes, said implement comprising:
   (a) a pair of semicircular blades disposed in closely adjacent parallel relation to each other, and forming parallel sharpened semi-circular edges and parallel continuous sharpened essentially radially extending straight edges having a length approximating the depth of the fruit half at its center, said straight edges forming with said semi-circular edges sharpened points adapted to straddle a memberane and be thrust into the fruit half while said straight edges are guided by the junctures between adjacent membranes until said sharpened points engage the rind whereupon said sharpened points are adapted to be moved along said rind away from the line of entry whereby the semi-circular blades sever the segment from said membrane;
   (b) and a single blade wedge shaped in plan and curved in side aspect to approximately the curvature of the interface between the segment and the rind, whereby, when said single blade is moved in proximity to said interface, the cuts formed by said semi-circular blades and single blade intersect to sever said segment.

2. An implement for severing the segments of a half portion of grapefruit, orange or similar fruit wherein the segments are joined to each other by radiating membranes, and are also joined to the essentially hemispherical rind of the fruit between said membranes, said implement comprising:
   (a) a single piece metal member of U-shaped cross section with the sides closely contiguous;
   (b) the sides of said member being widened near one end and continuing axially beyond the web to form a pair of continuous straight edges approximating the depth of the fruit at the junctures of said segments and curved edges joining said straight edges to form a pair of points;
   (c) said widened portions forming between said sharpened edges a pair of double blades adapted to straddle a membrane to sever the adjacent segments therefrom by thrusting the pointed ends of said blades into the fruit at the apeces of adjacent segments then moving said blades radially while said points trace said rind adjacent said membrane;
   (d) the opposite end of said U-shaped member merging into a laterally flattened wedge-shaped single blade sharpened along its side edges and terminating in a point, and curved in side aspect into approximate conformity with the interface between said segment and rind, the width of said single blade increasing from its point in approximate correspondence to the increase in width of said segment whereby on insertion of said single blade along the interface between said segment and said rind and side displacement thereof the side edges of said single blade trace adjacent membranes adjacent said rind to effect complete severance of a segment.

References Cited

UNITED STATES PATENTS

| D. 48,692 | 3/1916 | Mouser | 30—24 X |
|---|---|---|---|
| 381,657 | 4/1888 | Toucey | 30—149 X |
| 1,326,373 | 12/1919 | Rice | 30—24 |
| 2,051,680 | 8/1936 | Collens | 30—304 X |
| 2,591,973 | 4/1952 | Smith | 30—24 |
| 2,636,266 | 4/1953 | Sweet | 30—324 |
| 3,086,286 | 4/1963 | Faller | 30—24 |

FOREIGN PATENTS 1,175,905  11/1958  France.

ROBERT C. RIORDON, Primary Examiner

G. F. GRAFEL, Assistant Examiner